United States Patent [19]

Hanami et al.

[11] Patent Number: 4,868,805
[45] Date of Patent: Sep. 19, 1989

[54] INSPECTION APPARATUS

[75] Inventors: Osamu Hanami; Shinichi Nomura; Toshiharu Kogure, all of Narashino, Japan

[73] Assignee: Seiko Seiki Kabushiki Kaisha, Japan

[21] Appl. No.: 85,071

[22] Filed: Aug. 13, 1987

[30] Foreign Application Priority Data

Aug. 13, 1986 [JP] Japan .................................. 61-189922
Aug. 13, 1986 [JP] Japan .................................. 61-189923
Aug. 13, 1986 [JP] Japan .................................. 61-189924

[51] Int. Cl.$^4$ .............................................. H04N 5/76
[52] U.S. Cl. ...................................................... 369/53
[58] Field of Search ............................... 369/53, 54, 58

[56] References Cited

U.S. PATENT DOCUMENTS

| 4,477,890 | 10/1984 | Mooney et al. | 369/53 |
| 4,488,277 | 12/1984 | McFarlane et al. | 369/48 |
| 4,494,158 | 1/1985 | Fujibayashi | 369/53 |
| 4,499,569 | 2/1985 | Lopez De Romana | 369/54 X |
| 4,516,242 | 5/1986 | Yokota | 369/54 X |
| 4,538,257 | 8/1985 | Klinger | 369/58 X |
| 4,698,695 | 10/1987 | Kosaka et al. | 369/58 X |

Primary Examiner—William L. Sikes
Assistant Examiner—Akh E. Ullah
Attorney, Agent, or Firm—Bruce L. Adams; Van C. Wilks

[57] ABSTRACT

The present invention provides an inspection apparatus for inspecting an object such as an information storage medium or an information recording/reproducing head under set inspection conditions, which comprises: a sensor for identifying the type of object set for inspection by its size, and automatic inspection condition setting means for automatically setting the inspection conditions for the object to be inspected which are associated with the type identified.

16 Claims, 8 Drawing Sheets

INSPECTION APPARATUS

INSPECTION APPARATUS

FIELD OF THE INVENTION

This invention relates to an inspection apparatus and more particularly relates to an improved inspection apparatus which embodies a clamping mechanism to clamp the objects for inspection such as magnetic disk, laser disk, silicone wafer and others and to carry out the inspection with objects under the conditions specified before hand.

BACKGROUND OF THE INVENTION

In known inspection equipment for objects including information storage media such as hard disks or optical disks, heads for recording information in those storage media and reproducing the stored information, or silicone wafers, the inspection conditions including items to be inspected, machine operations associated with those items and data representing the criteria upon which the inspection results are based are manually set in correspondence with the type of the object to be inspected.

Those operations with the conventional inspection devices are time consuming and may cause a mistake in preparing the test conditions. The method employing air suction to clamp a disk has been generally adopted to actual use.

However, such a clamping mechanism which utilizes air suction suffers from a disadvantage in that it cannot retain the disk if the air supply should fail when a disk is clamped. Further, it requires ancillary devices such as a vacuum pump and filter making the size of the entire equipment larger and thereby increasing its production cost.

As part of the clamping mechanism for a disk, some prior inspection devices utilize a chuck portion which clamps a work piece of the disk, a tool and other objects, rotating in synchronization with a rotation shaft like a spindle applied in various machine tools.

In such a chuck section, it is known to release and close the chuck mechanism by sliding a driving shaft inserted in a hole of the rotary shaft by means of a hydraulic or pneumatic cylinder.

However, the hydraulic cylinder requires ancillary devices such as a hydraulic pressure generating device and pipings. Therefore, if it is employed as a drive source, the production costs of the equipment are increased, as well as the size thereof.

Further, the hydraulic cylinder is usually mounted on the rotary shaft. This serves to increase the load applied to the rotary shaft system, necessitating the use of a motor having an increased capacity for the purpose of driving the rotary shaft. This in turn increases the production cost and the size of the equipment.

If the pneumatic cylinder is used as a drive source to drive the chuck section, a large-scale ancillary facility is required, increasing the production cost of the equipment. The pneumatic cylinder is also often mounted on the rotary shaft. This therefore increases the load applied to the rotary shaft system and necessitates the use of a drive motor having a large capacity.

The pneumatic cylinder also suffers from problems of air leakage from the cylinder and a contamination from the exhaust.

To simplify the whole structure, it has been proposed that the sole driving shaft inserted within the rotary shaft may be pressed for the purpose of driving the chuck section. In this method, however, since the driving shaft alone slides every time the chuck is released or closed, bearings which journal the rotary shaft are overloaded while the driving shaft is caused to slide, reducing the life thereof and degrading the accuracy thereof.

SUMMARY OF THE INVENTION

The present invention is designed to overcome the above-described problems of the prior art, and an object thereof is to provide an inspection apparatus which is capable of reducing the time required for inspection, and which can prevent erroneous setting of inspection conditions.

Other objects of the present invention are to provide a clamping mechanism for driving a clamp section which is capable of transferring power to the clamp section without overloading the bearings which support a driving shaft or a guide shaft, which requires no ancillary devices, unlike a hydraulic or pneumatic mechanism and which clamps a disk with uniform force without giving any damage to the disk surface and stably in a clamping reference plane.

To achieve the above-described other objects, the present invention provides an inspection apparatus for inspecting an object such as an information storage medium or an information recording/reproducing head under set inspection conditions, which comprises: a sensor for identifying the type of object set for inspection by its size, and automatic inspection condition setting means for automatically setting the inspection conditions for the object to be inspected which are associated with the type identified. In this way the apparatus makes it possible for the inspection conditions of an object set for inspection to be automatically set in correspondence with its type. The time required to set these inspection conditions can therefore be reduced, and an accurate setting is enabled. These in turn enable effective inspection of objects without errors.

In a clamping mechanism of the present invention, the above-described objects are achieved by the provision of an apparatus for driving a clamp section mounted on a leading end of a guide shaft used for guiding a driving shaft, by sliding the driving shaft, which comprises: a first link for sliding the driving shaft; a second link for pressing against and holding the guide shaft at the time of the sliding of the driving shaft; and a drive section for driving the first and second links jointly.

The disk clamping mechanism of this invention is therefore characterized in that for the insertion or removal of the disk, the sliding shaft is raised while being rotated in conjunction with the rise of the driving shaft so as to locate the latch mounted on the upper end of the sliding shaft inside the inner diameter of the disk. For the clamping of the disk, of the other hand, the sliding shaft is lowered while being rotated so as to open the latch outwardly, and the force of the elastic body is used to press against and hold the disk by the leading end of the latch.

In consequence, when the disk is inserted into or removed from the clamping reference plane, the driving shaft is raised, and the sliding shaft is thereby raised and rotated. This action locates the latch inside the inner diameter of the disk and thereby facilitates the insertion or removal of the disk.

On the other hand, while the disk is set in the clamping reference plane, the driving shaft is at its lowermost position. The sliding shaft is therefore also at its lowermost position, and is urged downward by the elastic member. During this time, the leading end of the latch fixed to the upper end of the sliding shaft is located outside the inner diameter of the disk In consequence, the disk is pressed in the vicinity of the inner diameter thereof by the force of the elastic member. This enables the disk to be retained stably with a uniform clamping force.

Furthermore, the clamping body, which houses the sliding shaft with the latch, the elastic body and the cam mechanism in a compact manner, is removably mounted on the rotary shaft by a known means such as bolt clamping. Therefore, when a magnetic disk having a different diameter is to be clamped, the clamping body can be easily and quickly replaced with one corresponding to that disk.

In the clamp section driving apparatus, when the clamp section is released, the driving shaft within the guide shaft is caused to slide by the first link while the guide shaft is pressed by the second link in the direction opposite to that of the movement of the first link. In consequence, even if the frictional force is applied to the inner periphery of the guide shaft while the driving shaft is being made to slide by the first link, the bearings on the outer periphery of the guide shaft are not overloaded because of the support by the second link. This enables the life of the bearings to be prolonged, and prevents degradation in accuracy of the bearings.

Comprising first and second links and a drive section for driving these links jointly, the driving apparatus of this invention has a simple structure, and requires no large-scale facility, as compared with a hydraulic or pneumatic mechanism. It is therefore possible to reduce the production cost. Further, the first and second links are not in contact with the driving shaft and the guide shaft while the guide shaft is being rotated. Therefore, a drive motor having a small capacity is enough to drive the guide shaft, allowing the overall size of the equipment to be made smaller.

DETAILED DESCRIPTION OF THE INVENTION

A preferred embodiment of the present invention will be described below with reference to the accompanying drawing.

Figure 1:
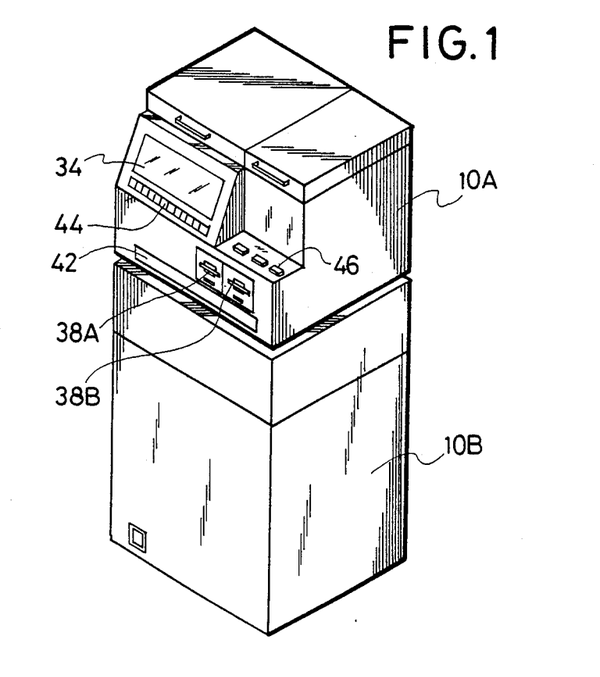
FIG. 1 is a perspective view of a preferred embodiment of an inspection apparatus according to this invention.
Figure 2:
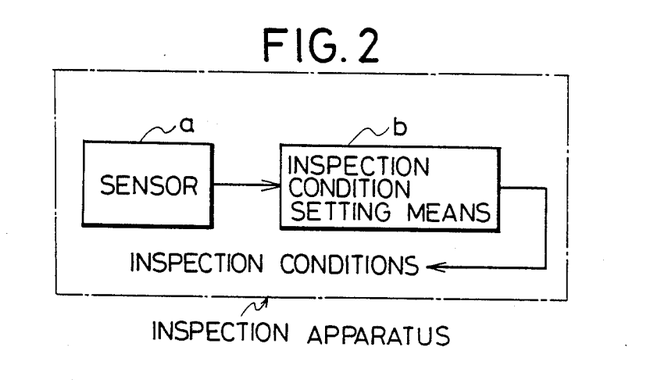
FIG. 2 is a block diagram illustrating the function of a portion of a device of this invention.

Referring to FIG. 1, the inspection apparatus is divided into a case 10A and a case 10B. In the embodiment shown in FIG. 1, the case 10A and the case 10B are arranged in a stack, with the case 10A being placed on the ceiling plate of the case 10B.

Figure 4:
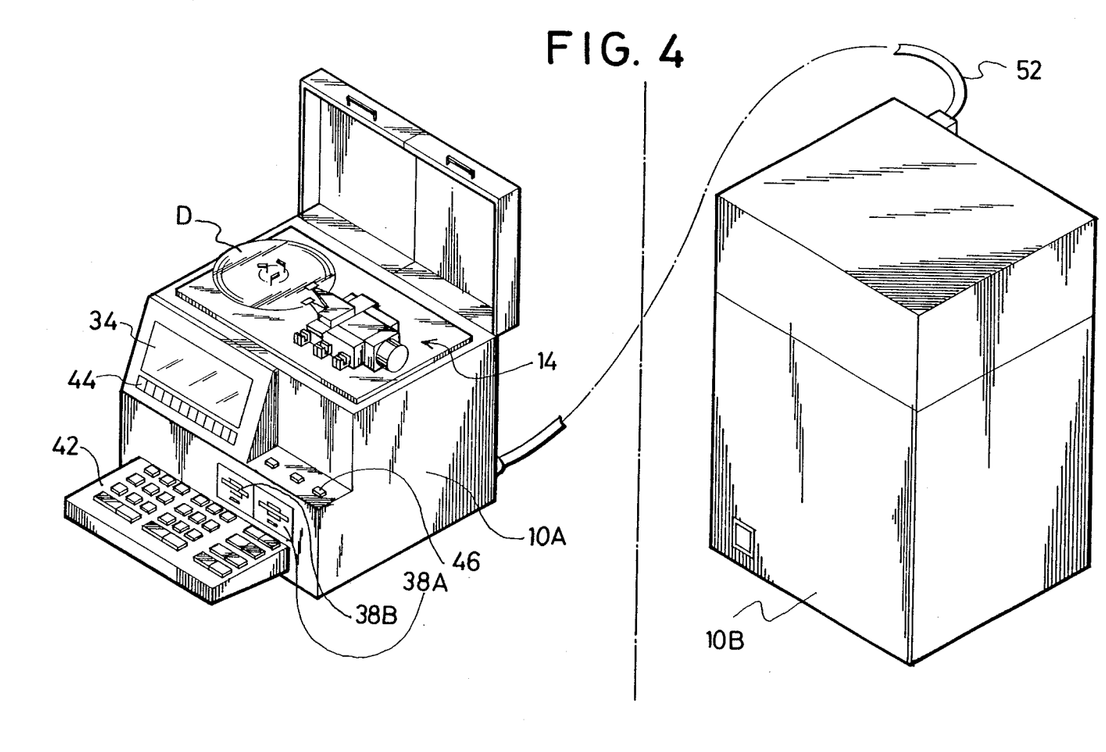
FIG. 4 illustrates the positional arrangement of a case 10A and a case 10B of the apparatus shown in FIG. 1.

In order to carry out inspection of a disk D shown in FIG. 4 (an inspection object) with the apparatus, the apparatus is installed in the state shown in FIG. 1 in a clean environment (e.g., in a clean room with cleanliness of class 100 to 10000). Alternatively, the case 10A alone onto which the disk D is set may be installed in the clean environment while the case 10B is placed in a normal environment, as shown in FIG. 4.

Figure 5:
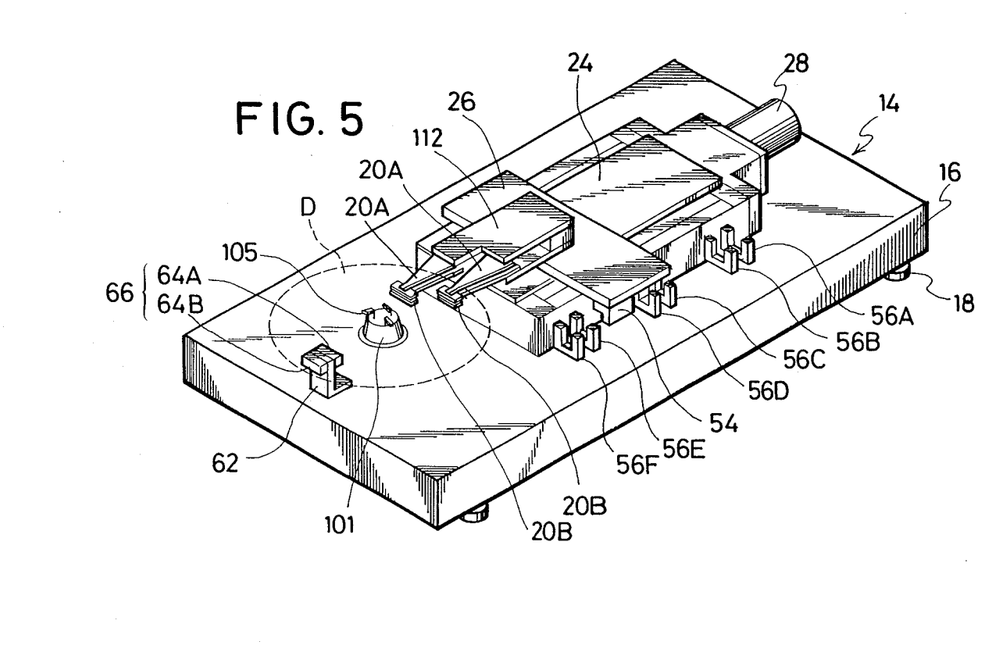
FIG. 5 is a perspective view of an inspection mechanism 14 of the apparatus of FIG. 1.

The case 10A of the inspection apparatus houses an inspection mechanism 14 such as that shown in FIG. 5.

The inspection mechanism 12 includes a base plate 16 placed on the frame of the case 10A via dampers 18. The enclosing frame of the case 10A and the use of the thick base plate 16 and the dampers 18 combine to prevent external vibrations from being transmitted to the inspection mechanism 14.

The inspection mechanism 14 further includes a head moving mechanism 24 which moves heads 20A, 20B toward and away from a clamping body 101. A moving table 26 of the head moving mechanism 24 is driven by a pulse motor 28 to move the heads 20A, 20B. Each of heads 20A, 20B inspects each plane of the disc D.

The moving table 26 is guided in the direction of movement of the heads 20A, 20B along a guide (not shown), and is driven by the pulse motor 28 via a ball screw (not shown).

The inspection mechanism 14 further includes a mechanism for elevating the heads 20A, 20B, a mechanism for rotating the clamping body 101, and a mechanism for latching the disk D placed on the clamping body 101 with three latches 105. Motors 113, 127 for driving these mechanisms and the pulse motor 28 together form a driving section 30 such as that shown in FIG. 3.

Figure 3:
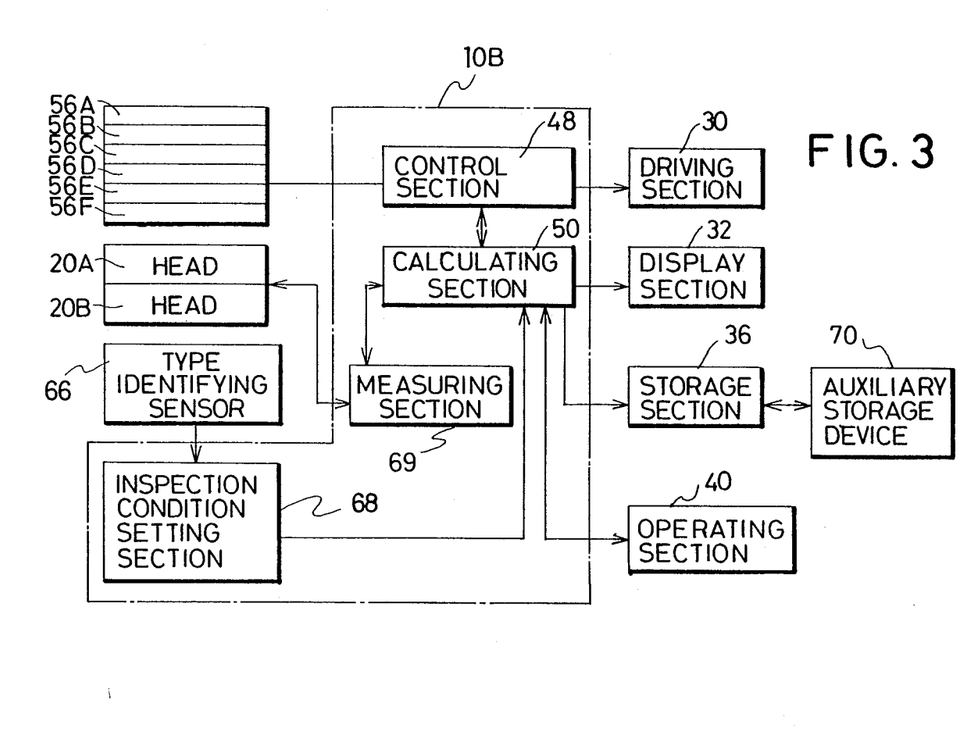
FIG. 3 is a functional block diagram of the embodiment shown in FIG. 1.

A display section 32 as shown in FIG. 3 is formed by displayer 34 mounted on the front portion of the case 10A, as shown in FIG. 4. Floppy disks which are used as storage media for a storage section 36 to store the processing programs or I/O data are inserted through insert ports 38A, 38B mounted on the lower front portion of the case 10A, as viewed in FIG. 4.

An operating section 40 as shown in FIG. 3 is formed by a key board 42, function switches 44, and switches 46 to be used for starting/stopping of the apparatus, all of these being mounted on the front portion of the case 10A, as shown in FIG. 4.

A control section 48, a measuring section 69 and a calculating section 50 are housed in the case 10B which is electrically connected to the case 10A via a cable 52.

A light shielding plate 54 is mounted on the right side of and below the moving table 26, as viewed in FIG. 5. Along the passage of the light shielding plate 54 are disposed six photo-interrupters 56A, 56B, 56C, 56D, 56E, 56F in that order from the pulse motor 28 toward the clamping body 101.

Figures 6, 7:
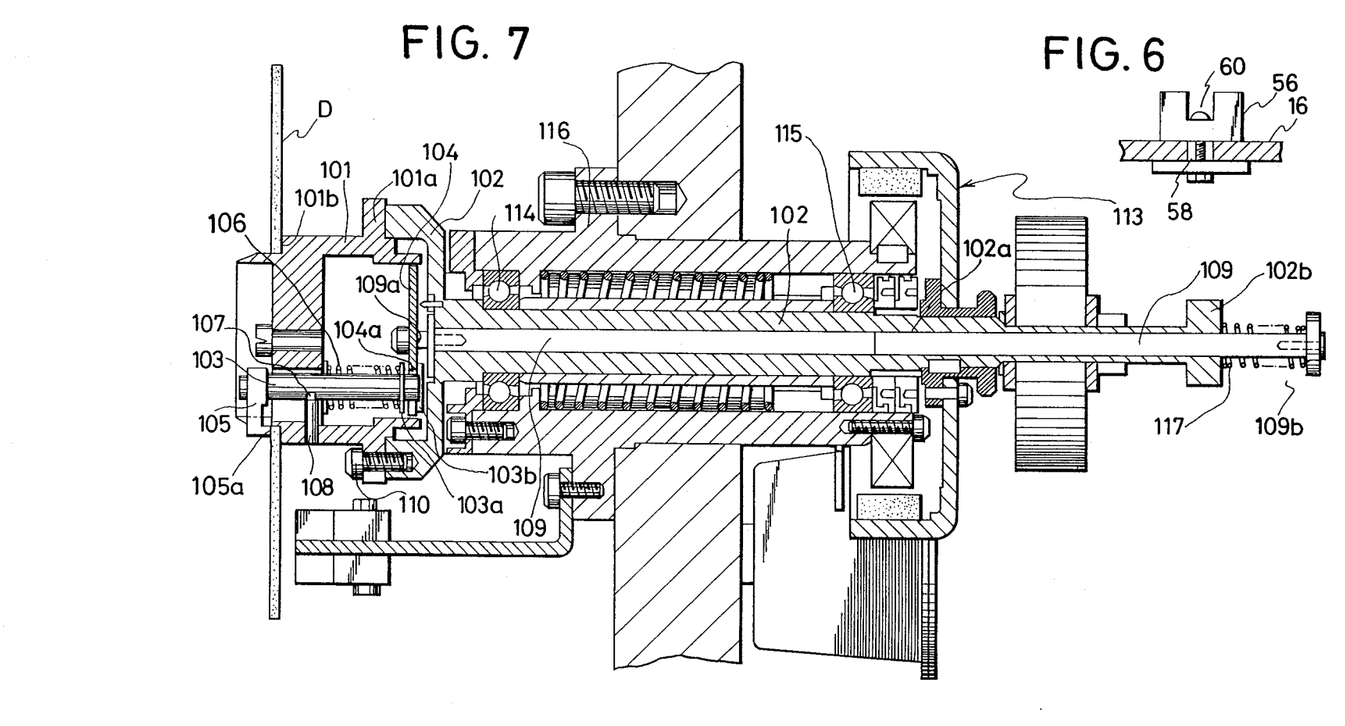
FIG. 6 is a side view in cross section showing the positioning of photo-interrupters of FIG. 5.
FIG 7 is a cross-sectional view of a disk clamping mechanism of this invention.

The base plate 16 is provided with a groove 58 such as shown in FIG. 6 which runs in a straight line along the direction of disposal of the photo-interrupters 56A, 56B, 56C, 56D, 56E, 56F, so that the photo-interrupters are disposed along the groove 58 at predetermined positions by screwing threads 60 therethrough, as can be seen in FIG. 6.

In this embodiment, inspection involves 5.25-inch and 3.5-inch disks D. The position at which the photo-interrupters 56A, 56B are fixed correspond to the position to which the heads 20A, 20B are retracted when inspecting 5.25-inch and 3.5-inch disks, respectively. The respective positions at which the photo-interrupters 56C, 56D and the photo-interrupters 56E, 56F are fixed correspond to those of outer peripheries of the storage areas of the 5.25-inch and 3.5-inch disks and those of inner peripheries thereof, respectively.

The base plate 16 is provided with an L-shaped fixture 62 at the forward end portion thereof, as viewed in FIG. 5, on which light-transmitting/receiving elements 64A, 64B are mounted at the upper portion thereof.

The light transmitting/receiving elements 64A, 64B are used to determine if the disk D is that of 5.25 inches or 3.5 inches (type identification by size). The detection signal of a type identifying sensor 66 as shown in FIG. 3 which is constituted by the light transmitting/receiving elements 64A, 64B and is supplied to an inspection condition setting section 68 contained in the case 10B.

In response to the detection signal, the inspection condition setting section 68 first sets the items to be inspected, then selects the machine operations (sequence programs) associated with those items and the set values of the measuring section 69.

The control section 48 controls the motors which constitute the driving section 30 of the basis of the detection signals of the heads 20A, 20B and those of the photo-interrupters 56A, 56B, 56C, 56D, 56E, 56F and in accordance with the control instructions delivered from the calculating section 50.

For example, when the disk D is set on the inspection mechanism 14 by a disk feed device (not shown) and the disk D is latched by the latches 105, the heads 20A, 20B are first retracted to the position which corresponds to that of the photo-interrupter 56A or 56B and then moved within the storage area of the disk D which is determined by the positions of the photo-interrupter 56C or 56D and the photo-interrupter 56E or 56F.

Before the start of this movement and after the completion thereof, the heads 20A, 20B are elevated away from and moved close to the disk D.

As the heads 20A, 20B are moved in the radial direction of the disk D during the inspection thereof, they output head detection signals. Those signals are supplied to the measuring section 69 to be processed. The processed results are supplied to the calculating section 50, and the calculation results of the calculating section 50, are displayed on the displayer 32 as inspection results and stored in the storage section 36 at the same time.

As can be seen from the foregoing description, the type identifying sensor 66 determines whether the disk D set on the inspection mechanism 14 is a 5.12-inch disk or a 3.5-inch one, and the identification results are used by the inspection condition setting 68 to automatically determine and set the sequence of selected inspection conditions. This enables the inspection time to be reduced, as well as the elimination of erroneous setting of the inspection conditions.

The sensor elements constituting the type identifying sensor 66 may be mounted on the head moving mechanism 24 such a the moving table 26. The type identifying sensor 66 may be constructed such that it detects the inner diameter of the disk D.

The sensor elements may also be mounted on a mechanism which is independently movable in the radial direction of the disk D.

Position detectors such as rotary encoders or linear encoders may be employed in place of the photo-interrupters 56A, 56B, 56C, 56D, 56E, 56F.

The foregoing is mainly described the inspection for disk, but the inspection for head is also possible to carry out by combining reference disk with clamping body.

Next, the clamping mechanism for the disk D is described.

Referring first to FIG. 7, a clamp body generally designated by reference numeral 101 is substantially cylindrical. The outer periphery of the lower portion of the clamp body 1 is provided with a flange 101a which is fixed to a rotary shaft 102, and the upper portion thereof is provided with a shoulder 101b onto which a disk D, which is a storage medium such as a magnetic disk or an optical disk is fitted.

The clamp body 101 is rotated together with the rotary shaft 102 by the output of a motor 113, to rotate the disk D.

In this embodiment, three sliding shafts 103 (FIG. 8) are housed in the clamp body 101 in such a manner as to be slidable in the vertical direction. The lower end of each sliding shaft 103 is fitted into a recess 104a in the periphery of a substantially flat disk-like guide plate 104 positioned at the bottom of the clamp body 101, and each sliding shaft 103 is retained relative to the guide plate 104 by flanges 103a, 103b.

A latch 105 is fixed to the upper end of each of the sliding shafts 103. A leading end 105a of the latch 105 is bent downward to hold the disk D firmly.

A helical compression spring 106 is mounted on the outer periphery of each of the sliding shafts 103 with one end thereof in contact with the bottom of the upper portion of the clamp body 101 and the other end thereof in contact with the flange 103a of the sliding shaft 103, to urge the sliding shaft 103 downward.

Figure 9:
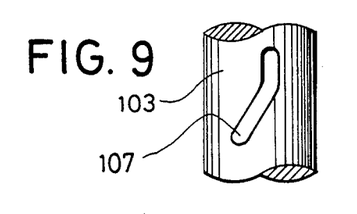
FIG. 9 is a partial view of a lead formed on part of a sliding shaft.

As shown in FIG. 9, the periphery of each sliding shaft 103 is provided with a lead 107. The lead 107 is inclined at a predetermined angle, and receives an engaging pin 108 projecting from the inner side wall of the clamp body 101.

This arrangement enables the sliding shaft 103 to be rotated as it moved in the vertical direction.

In addition, the guide plate 104 is fixed to an upper end 109a of a driving shaft 109 which can be elevated.

The rotary shaft 102, which is a guide shaft for guiding the driving shaft 109, is journalled in a housing 116 by upper and lower bearings 114, 115. A motor 113 rotates the rotary shaft 102 together with the clamp body 101 connected to the upper end thereof.

A driving shaft 109 is inserted in a shaft hole 102a of the rotary shaft 102. A helical compression spring 117 is provided between a lower end flange 109a of the driving shaft 109 and a lower end flange 102b of the rotary shaft 102 to urge the driving shaft 109 downward with respect to the rotary shaft 102.

Normally, the driving shaft 109 is at its lowermost position owing to the helical compression spring 117, and the guide plate 104 and the sliding shafts 103 which are housed in the clamp body 101 are also located at position shown by the solid lines in FIG. 7, so that the disk D is retained with stable clamping force by leading ends 105a of the latches 105 fixed to the upper ends of the sliding shafts, owing to the elastic forces of helical compression springs 106 wound on the outer peripheries of the sliding shafts 103.

In consequence, when the driving shaft 109 is raised or lowered by the operation of a drive device (described afterward) with the guide plate 104 positioned at the bottom of the clamp body 101 raising or lowering the sliding shafts 103 correspondingly, the sliding shafts 103 are slid in the vertical direction while being rotated by the engagement of the leads 107 with the corresponding engaging pins 108.

Figure 8:
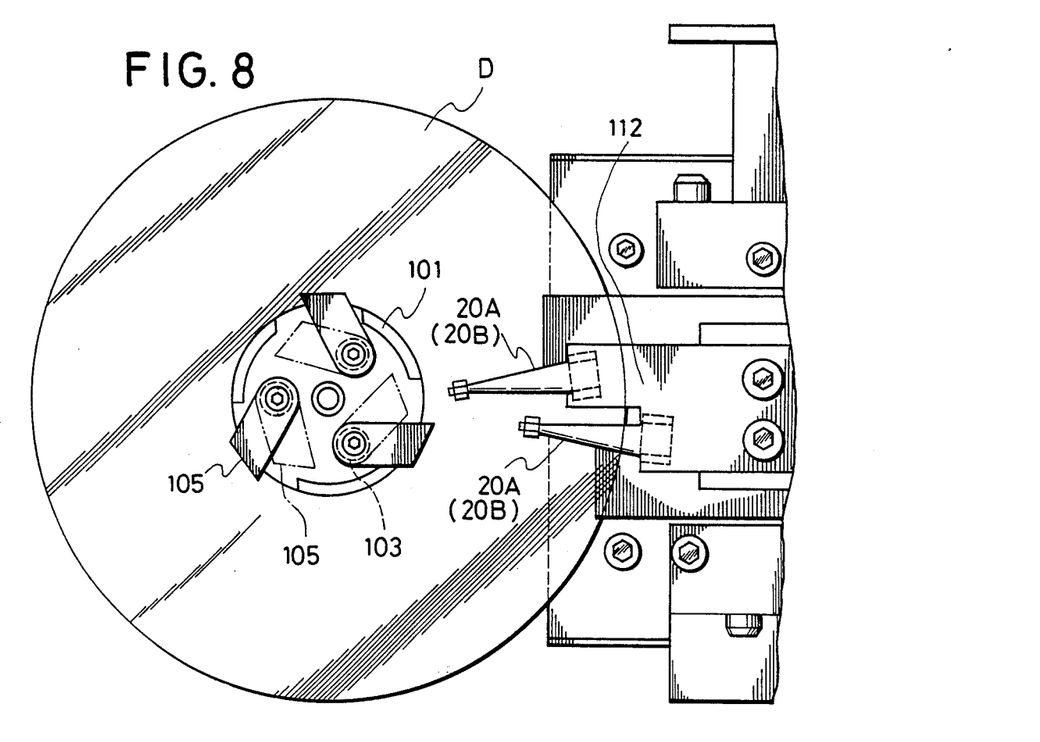
FIG. 8 is a plan view of the disk clamping mechanism of FIG. 1.

FIG. 8 shows the disk D in the state wherein it is clamped by the clamping mechanism of this invention, as viewed from above. As shown in the figure, while the disk D is clamped, the leading ends of the latches 105 fixed to the upper ends of the sliding shafts 103 are located outside the inner diameter of the disk D, and the forces of the helical compression springs 106 are exerted on the latches 105 to enable stable clamping of the disk D.

When the clamped disk D is removed from the clamping reference plane, the driving shaft 109 is raised, raising the sliding shafts 103 via the guide plate 104. During their upward movement, the sliding shafts 103 are rotated about their axes by the corresponding cam mechanisms which each of which is comprised of the lead 107 and the engaging pin 108, so that the latches 105 are moved to within the inner diameter of the disk D to positions shown by the dot-dot-dash lines in FIG. 8. The disk D can easily be removed from the clamping reference plane in this state. Similarly, the disk D is inserted into the clamping reference plane while the driving shaft is at its upper position with the latches 105 positioned inside the inner diameter of the disk D.

Accordingly, the latches 105 do not interfere with the insertion or removal of the disk D into and from the reference plane, thereby facilitating the handling of the disk D.

In this way, the clamp body 101 houses the sliding shafts 103, the guide plate 104, and the helical compression springs 106 in a compact manner, and the clamp body 101 is fixed onto the rotary shaft 102 by means of a bolt 110. Therefore, the clamp body can easily be removed from the rotary shaft 102 for replacement by unscrewing the bolt 110 (FIG. 7). This facilitates the exchange of clamp bodies having different specifications for clamping disks of different sizes, resulting in a reduction of the time required for replacing the clamp body.

Reference numerals 20A, 20B of FIG. 8 denote a magnetic heads for reading the data written on the disk D, while 112 indicates a carriage for driving the heads 20A, 20B to a predetermined position.

Next, an apparatus for sliding the driving shaft 109 will be described in detail below with reference to FIGS. 10 and 11.

A first link 118 is supported in such a manner as to be pivotal about a support 119. One end 118a of the first link faces the underside of the lower end flange 109a of the driving shaft 109. The lower end flange 109a of the driving shaft 109 is pushed upward by the pivot of the first link 118 to slide the driving shaft 109 upward.

A second link 120 is supported in such a manner as to be pivotal about a support 121. One end 121a thereof faces the upper surface of the lower end flange 102b of the rotary shaft 102. The second link 120 pivots in a direction opposite to the direction of pivot of the first link 118, thereby pressing the lower end flange 102b of the rotary shaft 102.

The other ends 118b, 120b of the first link 118 and the second link 120, respectively are supported by a cam follower 124 through third link 122 and fourth link 123, respectively.

Accordingly, a mechanism adapted by the present embodiment is a toggle linkage in which the first and second links 118, 120 are respectively pivoted by the linear motion of the cam follower 124 in opposite directions through the third and fourth links 122, 123.

The first link 118 and the cam follower 124 are respectively provided with helical compression springs 125, 126 which urge them in the directions shown by the arrows.

In this embodiment, the toggle linkage is driven by a motor 127 and a cam mechanism employing a cam disk 128 fixed on an output shaft 127a of the motor 127.

The operation of the apparatus for driving the clamp section according to this invention will be described below. When the cam disk 128 is rotated by the output of the motor 127, the cam follower 124 is pushed leftward, as viewed in FIG. 10, against the force of the spring 126 by virtue of its the contact with the outer periphery of the cam disc 128. This pivots the second link 120 counterclockwise about the supports 121 through the fourth link 123, as viewed in FIG. 10. As a result, the leading end 121a presses the upper surface of the lower end flange 102b of the rotary shaft 102 downward, allowing the rotary shaft 102 to be supported by the pressing force of the second link 120.

Figure 10:
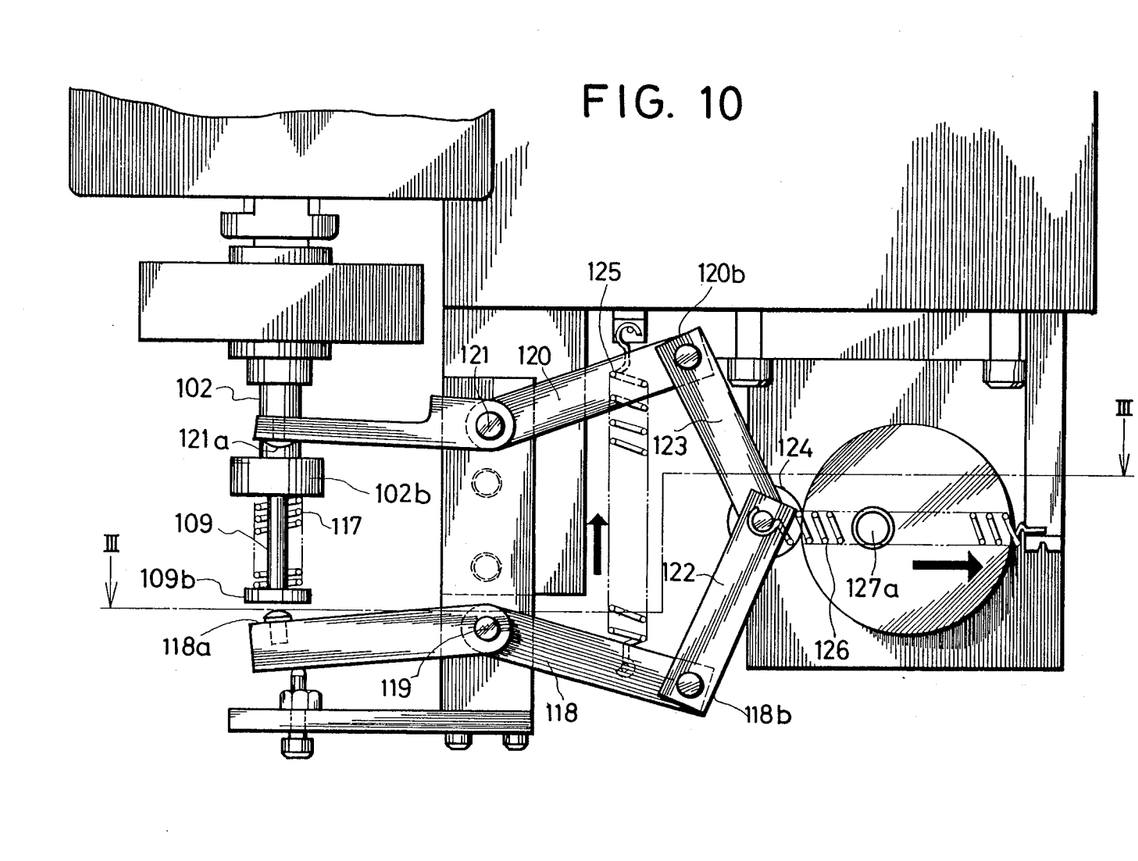
FIG. 10 is a partial side view of a mechanism for driving the disk clamping section.
Figure 11:
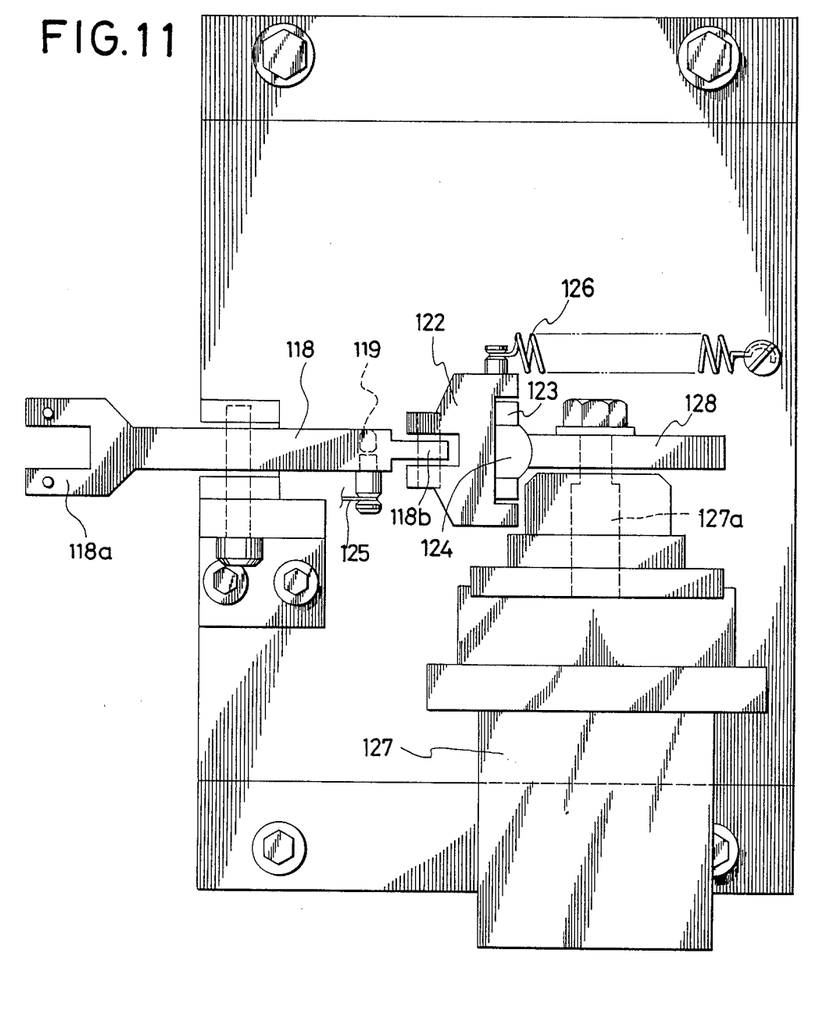
FIG. 11 is a cross-sectional taken along the line III—III of FIG. 10.

In conjunction with the operation of the second link 120, the motion of the cam follower 124 then pivots the first link 118 clockwise about the support 119 through the third link 122, as viewed in FIG. 10, against the force of the helical compression spring 125, pressing the underside on the lower end 109b of the driving shaft 109 and thereby sliding the driving shaft 109 upward.

The clamp mechanism is released by this upward sliding of the driving shaft 109 for insertion or removal of the disk D.

After the disk D is inserted in the clamp reference plane, the motor 127 and the cam disk 128 are rotated by closing a lid (not shown) or under other conditions. This returns the cam disk 128 to a position as shown in FIG. 10. At this time, the force of the helical compression spring 126 acts on the cam follower 124, returning it to its original position, and separating the first link 118 and the second link 120 away from the lower end 109a of the driving shaft 109 and the lower ends 102b of the rotary shaft 102 through the third link 122 and the fourth link 123, respectively.

In this embodiment, the first and second links 118, 120 are driven by the toggle linkage and the motor/cam mechanism.

This toggle linkage is effective to magnify a small input to provide a large output, while the motor/cam mechanism provides a compact structure, these combining to make this embodiment very practical. However, the driving means for the first and second links 118, 120 is not limited to this form, but other means may be adapted.

The mechanism for clamping the disk according to the present invention is not limited to that described in this embodiment but may be suitably modified in manner known to those skilled in the art. For example, in the embodiment, the outer periphery of the sliding shaft 103 is provided with the lead 107, and the engaging pin 108 engaging with the lead 107 is fixed on the inner side wall of clamp body 101. However, this may be the other way around, i.e., the inner periphery of the clamp body 101 may be provided with a lead while an engaging pin received in this lead may be formed on the sliding shaft. In addition, elastic members other than the helical compression springs 106 may be employed in place thereof.

The disk clamping mechanism of this embodiment is one for a rotary shaft system. However, the disk clamping mechanism is not limited to this embodiment but may be applied to a non-rotary system such as a hand section of a robot or a loading apparatus and a tool holder or a chuck mechanism for clamping a workpiece in a machining center.

The present invention makes it possible for the inspection conditions of an object set for inspection to be automatically set in correspondence with its type. The time required to set these inspection conditions can therefore be reduced, and an accurate setting is enabled. These in turn enable effective inspection of objects without errors.

The disk clamping mechanism of this invention allows the disk to be pressed with a uniform force by elastic members such as helical compression springs. In consequence, when compared with the conventional collet chuck, it does not damage the disk surface. It can also eliminate the accidental release of the clamping of the disk which often occurs with the known air suction system. Thus, the present invention is very effective in protecting disks, and also ensures that the disk can be stably clamped in the clamping reference plane.

The disk clamping mechanism of this invention requires no ancillary equipment such as the pump or filtering device necessary in an air suction system and therefore has a simple structure. This enables the production cost of this disk clamping mechanism to be reduced. Further, the disk clamping mechanism of this invention comprises a contact type of clamping body and various parts housed in the clamping body. This arrangement makes the replacement of the clamping body quicker and easier.

Further, the apparatus for driving the clamp section according to the present invention requires no large-scale ancillary devices such as hydraulic cylinder or pneumatic cylinders, and it does not need to be mounted directly on the rotary shaft. The load applied to the rotary shaft system therefore remains small. This allows a drive motor having small capacity to be employed, making the use of a small-sized and inexpensive motor possible.

In the apparatus of this invention, while the driving shaft for driving the clamp section is being caused to slide, the rotary shaft is supported by the linkage, and thus the bearings are not overloaded every time the clamp is released or closed. This prolongs the life of the bearings, as well as preventing degradation in accuracy thereof. These advantages together provide a very practical apparatus.

What is claimed is:

1. An apparatus for inspecting an information storage medium comprising:
    means for detecting a predetermined characteristic of the information storage medium;
    means for producing a signal of said detected characteristic of the information storage medium; and
    means responsive to said signal for initiating an inspection sequence and positioning at least one inspection head in predetermined positions relative to the information storage medium.

2. The apparatus of claim 1, comprising means for recording inspection signals in said information storage medium and reproducing the inspection signals stored therein.

3. The apparatus of claim 1, comprising means for detecting positions of said inspection head and for producing position signals corresponding to predetermined positions of said head relative to said information storage medium.

4. The apparatus of claim 3, in which said means for initiating an inspection sequence comprises means for controlling relative movement of said head in response to said position signals.

5. The apparatus of claim 1, wherein the information storage medium comprises a disk provided with a surface layer for storing digital information.

6. The apparatus of claim 1, wherein said detecting means comprises a plurality of photosensors each of which is located so as to correspond to one of a plurality of different types of information storage mediums.

7. The apparatus of claim 3, wherein said head position detecting means comprises a plurality of photointerrupters each of which is located so as to correspond to one of a plurality of predetermined positions of said inspection head.

8. The apparatus of claim 7, in which said plurality of predetermined positions of said inspection head consists of positions outside, on the outer periphery of, and on the inner periphery of said information storage medium.

9. The apparatus of claim 1, comprising a plurality of said inspection heads.

10. The apparatus of claim 9, comprising means for elevating said inspection heads relative to the information storage medium.

11. The apparatus of claim 5, comprising means for clamping said disk in position for said inspection sequence.

12. The apparatus of claim 11, in which said clamping means comprises a clamping body having disk clamping reference plane for receiving the disk; a sliding shaft rotatably housed in said clamping body and movable back and forth relative to said body, one end of said shaft having a disk clamping latch; means for actuating said sliding shaft; and means for rotating said sliding shaft upon actuation thereof, thereby to move said latch relative to said disk clamping reference plane.

13. Apparatus for inspecting an information storage medium comprising:
    type identifying sensor means for detecting a type of said information storage medium, and for producing a detection signal corresponding to the type of said information storage medium;
    head means movable relative to said information storage medium for recording inspection signals in said information storage medium and reproducing the inspection signals stored therein;
    head position detecting means for detecting positions of said head means and for producing position signals corresponding to predetermined positions of said head means relative to said information storage medium; and
    inspection condition setting means responsive to said detection signal for setting an inspection condition corresponding to the type of said information storage medium, said condition setting means controlling relative movement of said head means in response to said position signals.

14. The apparatus of claim 13, wherein said information storage medium comprises a disk provided with a surface layer for storing digital information.

15. The apparatus of claim 13, wherein said type identifying sensor means comprises a plurality of photosensors arranged at positions corresponding to a plurality of types of said information storage medium.

16. The apparatus of claim 13, wherein said position detecting means comprises a plurality of photointerrupters arranged at positions corresponding to positions of said head means placed outside, on the outer periphery of, and on the inner periphery of said disk.

* * * * *